United States Patent
Uchida

(10) Patent No.: US 10,090,710 B2
(45) Date of Patent: Oct. 2, 2018

(54) POWER RECEIVING APPARATUS WITH A PLURALITY OF RESONANCE COILS

(71) Applicant: FUJITSU LIMITED, Kawasaki-shi, Kanagawa (JP)

(72) Inventor: Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 528 days.

(21) Appl. No.: 14/337,302

(22) Filed: Jul. 22, 2014

(65) Prior Publication Data

US 2014/0333148 A1 Nov. 13, 2014

Related U.S. Application Data

(63) Continuation of application No. PCT/JP2012/051882, filed on Jan. 27, 2012.

(51) Int. Cl.

| H02J 5/00 | (2016.01) |
|---|---|
| H02J 50/12 | (2016.01) |
| H02J 50/70 | (2016.01) |
| H02J 7/02 | (2016.01) |
| H02J 7/00 | (2006.01) |

(52) U.S. Cl.
CPC .............. *H02J 50/12* (2016.02); *H02J 5/005* (2013.01); *H02J 50/70* (2016.02); *H02J 7/0042* (2013.01); *H02J 7/025* (2013.01)

(58) Field of Classification Search
CPC ...... H02J 5/00; H02J 7/00; H02J 17/00; H02J 50/12; H02J 50/70; H02J 5/005; H02J 7/0042; H02J 7/025
USPC .......................................... 307/104; 320/108
See application file for complete search history.

(56) References Cited

U.S. PATENT DOCUMENTS

| 8,378,524 | B2 | 2/2013 | Mita | |
|---|---|---|---|---|
| 8,508,184 | B2 * | 8/2013 | Sakakibara | B60L 5/005 180/65.1 |
| 8,901,779 | B2 * | 12/2014 | Kesler | H03H 7/40 307/104 |
| 2010/0052431 | A1 * | 3/2010 | Mita | B60L 11/182 307/104 |

(Continued)

FOREIGN PATENT DOCUMENTS

| JP | 04-317527 | 11/1992 |
|---|---|---|
| JP | 2009-106136 | 5/2009 |

(Continued)

OTHER PUBLICATIONS

JPOA—Office Action dated May 12, 2015 issued with respect to the corresponding Japanese Patent Application No. 2013-555096, with partial English translation.

(Continued)

*Primary Examiner* — Jared Fureman
*Assistant Examiner* — Michael Warmflash
(74) *Attorney, Agent, or Firm* — Fujitsu Patent Center

(57) ABSTRACT

A power receiving apparatus includes a plurality of resonance coils, a power receiving circuit, and a single wire configured to start at a first terminal of the power receiving circuit and to end at a second terminal of the power receiving circuit, the single wire forming one coil or a plurality of coils connected in series, wherein the one coil or the plurality of coils connected in series and the plurality of resonance coils are placed such that the one coil or the plurality of coils connected in series are couplable to the plurality of resonance coils.

9 Claims, 10 Drawing Sheets

(56) References Cited

U.S. PATENT DOCUMENTS

| | | | |
|---|---|---|---|
| 2010/0156346 A1* | 6/2010 | Takada | B60L 11/182 320/108 |
| 2010/0225271 A1* | 9/2010 | Oyobe | B60L 5/005 320/108 |
| 2010/0308939 A1* | 12/2010 | Kurs | H02J 5/005 333/219.2 |
| 2011/0254503 A1* | 10/2011 | Widmer | B60L 11/182 320/108 |
| 2011/0309792 A1 | 12/2011 | Mochida et al. | |
| 2012/0161696 A1* | 6/2012 | Cook | B60L 11/182 320/108 |
| 2013/0026850 A1* | 1/2013 | Throngnumchai | B60L 11/182 307/104 |
| 2013/0038281 A1* | 2/2013 | Sakakibara | B60L 5/005 320/108 |

FOREIGN PATENT DOCUMENTS

| | | |
|---|---|---|
| JP | 2010-063245 | 3/2010 |
| JP | 2011-134959 | 7/2011 |
| JP | 2011-229360 | 11/2011 |
| JP | 2011-234496 | 11/2011 |
| JP | 2011-234571 | 11/2011 |
| WO | 2010/100690 | 9/2010 |

OTHER PUBLICATIONS

JPOA—Office Action dated Oct. 6, 2015 issued with respect to the corresponding Japanese Patent Application No. 2013-555096, with partial English translation.

International Search Report of Int. Appl. No. PCT/JP2012/051882 dated Apr. 3, 2012.

\* cited by examiner

POWER RECEIVING APPARATUS WITH A PLURALITY OF RESONANCE COILS

CROSS-REFERENCE TO RELATED APPLICATIONS

This application is a continuation application of International Application PCT/JP2012/051882 filed on Jan. 27, 2012 and designated the U.S., the entire contents of which are incorporated herein by reference.

FIELD

The disclosures herein generally relate to power supply systems, and particularly relate to a wireless power supply system that wirelessly supplies electric power.

BACKGROUND

Technology for noncontact power feeding such as electromagnetic induction has been used in shavers, electrical toothbrushes, and the like. In recent years, there has been a wide interest in the technology that transmits electric power by use of magnetic resonance. In the magnetic resonance power transmission system, a coil (i.e., LC resonance coil) having a resonance function based on capacitor and inductor is provided on each of the transmission side and the reception side. The LC resonance coil provided on the transmission side and the LC resonance coil provided on the reception side have a common resonance frequency. Electric power is transmitted from the transmission side to the reception side via a high-frequency alternating-current magnetic field that oscillates at this resonance frequency. With this arrangement, highly efficient power transmission is achieved even when the distance between a power transmitter and a power receiver is increased or when the sizes of coils are different between a power transmitter and a power receiver.

The magnetic resonance power transmission system typically uses a four-coil configuration. On the transmission side, alternating-current electric power is supplied from an oscillator to a first coil via wire connections, and is then transferred via electromagnetic induction from the first coil to a second coil serving as a resonance coil. Power is transmitted via magnetic resonance from the second coil serving as a transmission-side resonance coil to a third coil serving as a reception-side resonance coil. On the reception side, power is transferred via electromagnetic induction from the third coil serving as a resonance coil to a fourth coil, and, then, alternating-current electric power is supplied from the fourth coil to a power receiving circuit via wire connections. The first coil and the second coil on the transmission side may be combined into one coil, and the third coil and the fourth coil on the reception side may be combined into one coil. Namely, at least one of the transmission side and the reception side may have a one-coil configuration, thereby using three coils in total in the entire system or using two coils in total in the entire system.

A power receiving apparatus that can receive power wirelessly generally has a power-receiving-purpose coil and a magnetic shield. Internal circuitry in the power receiving apparatus tends to have metal materials. Such metal materials may consume some of the energy of an electromagnetic field used for power transmission, resulting in a drop in power transmission efficiency. In order to prevent this, the magnetic shield is disposed between the internal circuitry and the power receiving coil that is situated close to the external surface of the power receiving apparatus. This magnetic shield is composed of a material having large permeability (i.e., the real part of permeability) and small magnetic loss (i.e., the imaginary part of permeability), so that the magnetic field extends along the magnetic shield. The magnetic field thus does not reach the metal materials provided inside the power receiving apparatus, so that power loss is avoided.

The fact that the power receiving coil is disposed at a certain position on the external surface of the power receiving apparatus with the magnetic shield being situated on an immediate inner side thereof means that power cannot be received properly unless the face having the power receiving coil is pointed toward the direction of a power transmitter. When the face having the power receiving coil is pointed opposite the direction of the power transmitter, the magnetic shield and metal materials inside the power receiving apparatus come in the way between the power transmitter and the power receiving coil. In such a case, the magnetic energy hardly reaches the power receiving coil. When the face having the power receiving coil is pointed perpendicularly to the direction of the power transmitter, also, the magnetic field and metal materials inside the power receiving apparatus obstruct the magnetic field, resulting in a large drop in power transmission efficiency.

In order to cope with the above-noted problems, a plurality of power receiving coils may be provided at more than one position on the external surfaces of the power receiving apparatus. A plurality of power receiving coils may be directed to respective, different directions, so that power coming from different directions can be efficiently received. In other words, the position of the power receiving apparatus that ensures efficient power reception is not limited to one position relative to the power transmitter, and any one of the different positions can ensure efficient power reception. Directions and numbers of the power receiving coils may be designed carefully, so that efficient power reception is achieved all the time irrespective of the position of the power receiving apparatus relative to the power transmitter.

The use of a plurality of power receiving coils means that these power receiving coils are connected to a common load (i.e., battery or the like). For example, alternating-current powers from the power receiving coils may be rectified by respective rectifying circuits. Obtained direct-current powers may then be coupled to the common load via a switching circuit. Alternatively, alternating-current powers from the power receiving coils may be coupled to a single rectifying circuit via a switch circuit. Rectified direct-current power may then be supplied to a single load. Either configuration ends up using a switch circuit, and also ends up using a control circuit for controlling switching operations. Further, the configuration that uses a plurality of rectifying circuits ends up providing duplicating circuits. Developing a circuit for controlling switching operations and an increase in the number of circuit components result in a cost increase with respect to the power receiving apparatus. Moreover, an increase in the number of circuit components also leads to a size increase with respect to the power receiving apparatus.

[Patent Document 1] Japanese Laid-open Patent Publication No. 2010-63245

SUMMARY

According to an aspect of the embodiment, a power receiving apparatus includes a plurality of resonance coils, a power receiving circuit, and a single wire configured to start at a first terminal of the power receiving circuit and to end at a second terminal of the power receiving circuit, the single wire forming one coil or a plurality of coils connected in series, wherein the one coil or the plurality of coils connected in series and the plurality of resonance coils are placed such that the one coil or the plurality of coils connected in series are couplable to the plurality of resonance coils.

According to an aspect of the embodiment, a power transmission system includes a power transmission apparatus, and a power receiving apparatus configured to receive power from the power transmission apparatus via magnetic resonance, wherein the power receiving apparatus includes a plurality of resonance coils, a power receiving circuit, and a single wire configured to start at a first terminal of the power receiving circuit and to end at a second terminal of the power receiving circuit, the single wire forming one coil or a plurality of coils connected in series, wherein the one coil or the plurality of coils connected in series and the plurality of resonance coils are placed such that the one coil or the plurality of coils connected in series are couplable to the plurality of resonance coils.

According to an aspect of the embodiment, a power transmission method includes supplying alternating-current power to a transmission-side resonance coil, receiving power from the transmission-side resonance coil via electromagnetic induction with at least one of a plurality of reception-side resonance coils that are pointed to respective, different directions, magnetically coupling the plurality of reception-side resonance coils with a single wire that forms one coil or a plurality of coils connected in series, and supplying power from the single wire to a power receiving circuit.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings. In these drawings, the same or corresponding elements are referred to by the same or corresponding numerals, and a description thereof will be omitted as appropriate.

Figure 1:
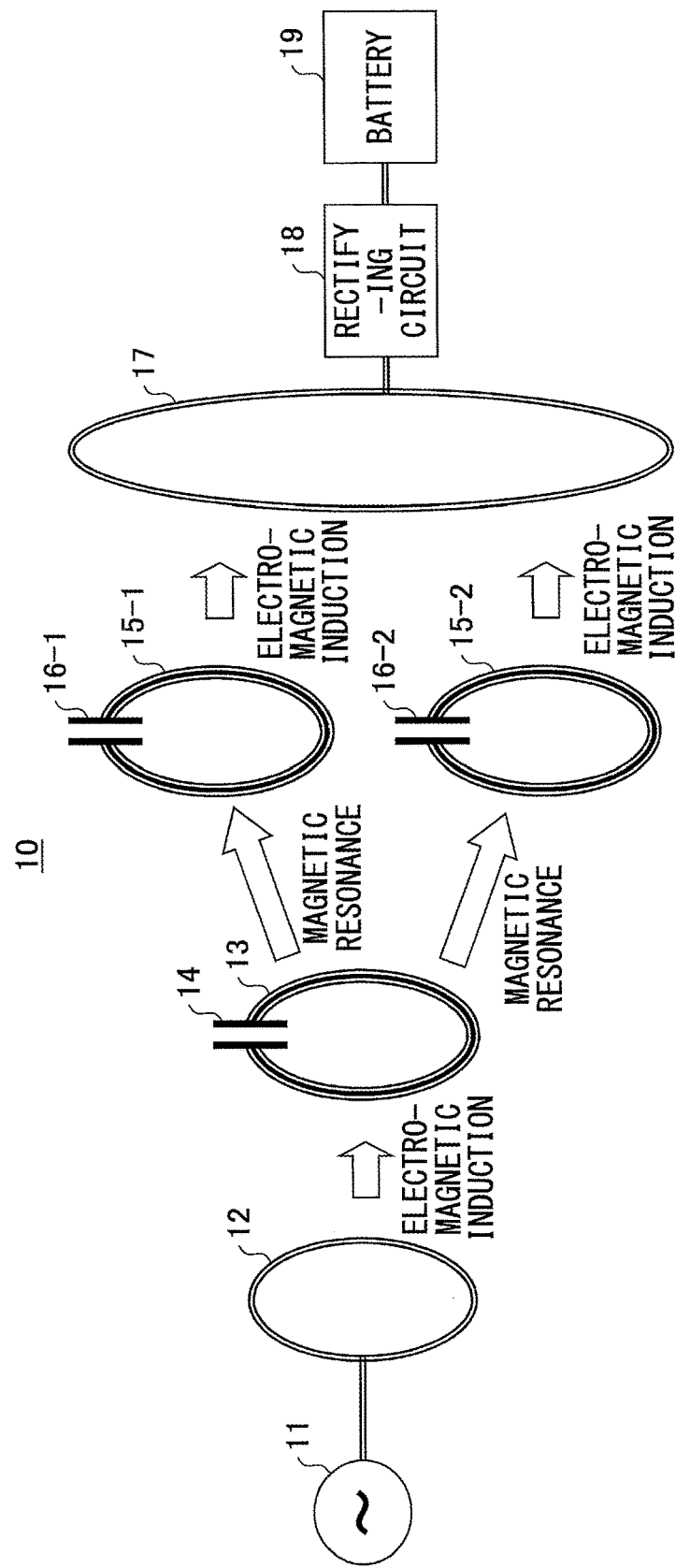
FIG. 1 is a drawing illustrating an example of the configuration of a magnetic resonance power transmission system.

FIG. 1 is a drawing illustrating an example of the configuration of a magnetic resonance power transmission system. A magnetic resonance power transmission system 10 illustrated in FIG. 1 includes an oscillating circuit 11, a coil 12, a resonance coil 13, a capacitor 14, resonance coils 15-1 and 15-2, capacitors 16-1 and 16-2, a coil 17, a rectifying circuit 18, and a battery 19. The oscillating circuit 11, the coil 12, the resonance coil 13, and the capacitor 14 correspond to a power transmitter. The resonance coils 15-1 and 15-2, the capacitors 16-1 and 16-2, the coil 17, the rectifying circuit 18, and the battery 19 correspond to a power receiver. The magnetic resonance power transmission system 10 in which the power receiver receives power from the power transmitter via electromagnetic resonance, the power receiver may include a plurality of resonance coils 15-1 and 15-2. The number of resonance coils is not limited to two. Three or more resonance coils may be provided.

The oscillating circuit 11 oscillates at desired oscillating frequency. The coil 12 is connected through wires to the oscillating circuit 11 serving as a power transmission circuit. The oscillating circuit 11 supplies alternating-current power having the above-noted oscillating frequency to the coil 12 via wire connections. The coil 12 is coupled with the resonance coil 13 via electromagnetic induction to supply power to the resonance coil 13.

The resonance coil 13 is coupled to the capacitor 14, so that the resonance coil 13 and the capacitor 14 serve as a resonance circuit. The resonance coil 15-1 is coupled to the capacitor 16-1, so that the resonance coil 15-1 and the capacitor 16-1 serve as a resonance circuit. Similarly, the resonance coil 15-2 is coupled to the capacitor 16-2, so that the resonance coil 15-2 and the capacitor 16-2 serve as a resonance circuit. These resonance circuits may have common resonance frequency. The oscillating circuit 11 may supply alternating-current power having this resonance frequency to the coil 12. In the example illustrated in FIG. 1, each capacitor coupled to a coil is illustrated as a condenser (i.e., capacitor element), but is not limited to such a configuration. Each capacitor may be the stray capacitance of a corresponding coil. The number of windings of each coil is not limited to a particular number. The number of windings of each coil may be one, or may be more than one. Each coil may be a helical coil or a spiral coil In the case of implementation on an external surface of a portable apparatus or the like, each coil preferably has a substantially flat shape. Accordingly, in the case of a helical coil having a plurality of windings, it is preferable for the length of the coil along the axis thereof to be substantially shorter than the diameter of the coil.

Electric current flowing through the resonance coil 13 oscillates at the resonance frequency. This causes, through magnetic coupling, electric current oscillating at the resonance frequency to appear in at least one of the resonance coils 15-1 and 15-2 having the same resonance frequency. The resonance coils 15-1 and 15-2 may be pointed to respective, different directions, and may be situated at respective, different locations on the power receiving apparatus (e.g., portable apparatus) in which the power receiver of the magnetic resonance power transmission system 10 is provided. The resonance coil of the power receiver that is pointed toward the direction of the power transmitter of the magnetic resonance power transmission system 10 receives stronger power than any other coils from the power transmitter via magnetic resonance. Both the resonance circuit including the resonance coil 13 and at least one of the resonance circuit including the resonance coil 15-1 and the resonance circuit including the resonance coil 15-2 resonate, resulting in large current flowing in the resonance circuits, thereby transmitting power from the transmission side to the reception side efficiently. Namely, electric power is transmitted via magnetic resonance from the resonance coil 13 to at least one of the resonance coils 15-1 and 15-2.

The resonance coils 15-1 and 15-2 are coupled to the coil 17 via electromagnetic induction, thereby supplying alternating-current power to the coil 17. The coil 17 is connected through wires to the rectifying circuit 18 serving as a power receiving circuit. The coil 17 supplies alternating-current power to the rectifying circuit 18 via wire connections. The rectifying circuit 18 generates a direct-current voltage by rectifying the alternating-current power, and applies the direct-current voltage to the battery 19 to charge the battery 19.

As was previously described, the number of windings of each coil may be one, or may be more than one. The phrase "the coil is pointed to a given direction" means that the direction of the axis of the coil generally coincides with the given direction. In the case of a helical coil having a plurality of windings, the direction of the axis of the coil is the direction of the center axis of an imaginary or physical cylinder or prism body around which a coil wire is wound, and corresponds to the direction of magnetic flux passing through the coil. In the case of a spiral coil, the direction of the axis of the coil is the direction perpendicular to the plane that includes the spiral, and corresponds to the direction of magnetic flux passing the center of the coil in the plane that includes the coil. In the case of a single-winding coil, the direction of the axis of the coil is the direction perpendicular to the plane that includes the single-winding coil, and corresponds to the direction of magnetic flux passing the center of the coil in the plane that includes the coil.

Figure 2:
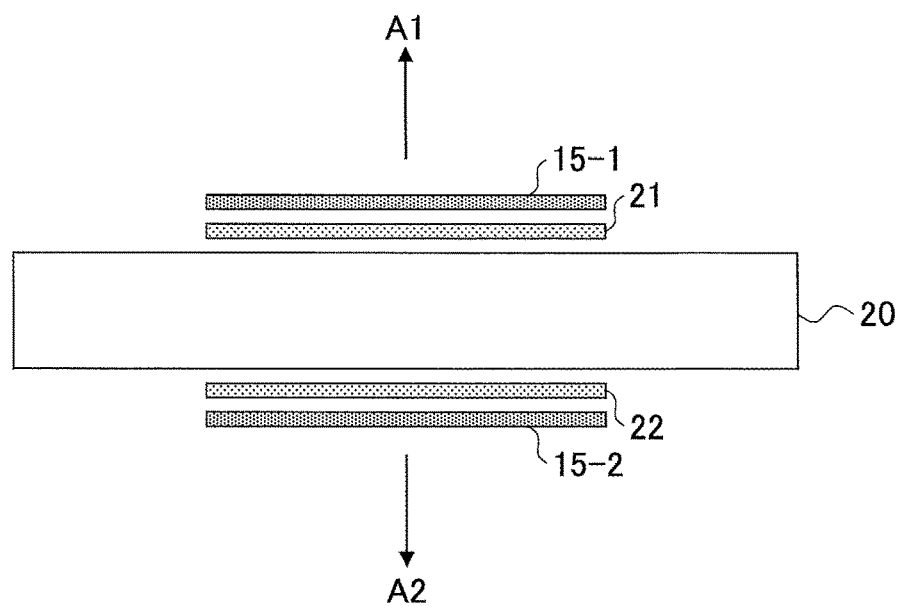
FIG. 2 is a drawing illustrating a schematic example of the configuration of a receiver apparatus.

FIG. 2 is a drawing illustrating a schematic example of the configuration of the power receiving apparatus. The power receiving apparatus illustrated in FIG. 2 may be a portable apparatus such as a portable phone, and includes a main body 20, the resonance coils 15-1 and 15-2, and magnetic shields 21 and 22. The main body 20 includes internal circuitry that corresponds to the rectifying circuit 18 and the battery 19 illustrated in FIG. 1 as well as circuits for implementing the functions of the power receiving apparatus (e.g., voice communication function, data communication function, etc.).

FIG. 2 schematically illustrates the positional relationships between the main body, the resonance coils, and the magnetic shields, and is not intended to illustrate a tangible, physical structure, connective relationships, etc. The resonance coils 15-1 and 15-2 and the magnetic shields 21 and 22 may be disposed on, and attached by adhesive or the like to, a plane that can support another member situated at the outermost layer of the main body 20. Further, the case of the power receiving apparatus may cover the entirety of the main body 20 and the resonance coils 15-1 and 15-2. The case may be a box-shaped case made of plastics or the like. Alternatively, the resonance coils 15-1 and 15-2 and the magnetic shields 21 and 22 may be attached by adhesive or the like to an inner surface of the case of the power receiving apparatus, which is a box-shaped case made of plastics or the like. The main body 20 may be situated in the space that exists deeper inside. Regardless of the specific physical structure, the magnetic shield 21 is disposed between the resonance coil 15-1 and the main body 20, and the magnetic shield 22 is disposed between the resonance coil 15-2 and the main body 20.

In the example illustrated in FIG. 2, the resonance coil 15-1 is pointed in the direction indicated by an arrow A1, and the resonance coil 15-2 is pointed in the direction indicated by an arrow A2. Accordingly, in the case of the power transmitter being situated in the direction indicated by the arrow A1, the resonance coil 15-1 mainly receives power from the resonance coil 13 via magnetic resonance. In the case of the power transmitter being situated in the direction indicated by the arrow A2, the resonance coil 15-2 mainly receives power from the resonance coil 13 via magnetic resonance.

Figure 3:
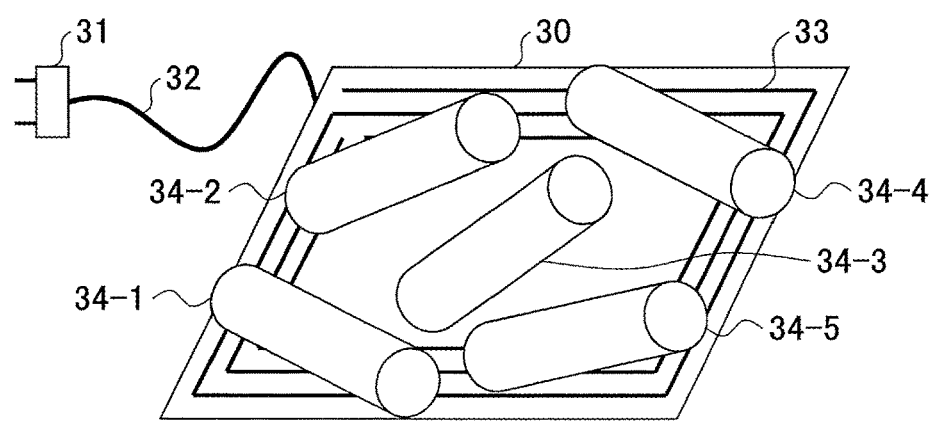
FIG. 3 is a drawing illustrating an example of a first embodiment of the power transmission system.

FIG. 3 is a drawing illustrating an example of a first embodiment of the power transmission system. The power transmission system illustrated in FIG. 3 includes a power transmitter 30, a plug 31, an electrical cord 32, and rechargeable batteries 34-1 through 34-5 which include power receivers. The power transmission system charges the rechargeable batteries 34-1 through 34-5 via magnetic resonance. The plug 31 is plugged into an outlet that provides commercial power supply, and supplies power to the power transmitter 30 through the electrical cord 32. The power transmitter 30 having a plate shape includes a resonance coil 33 that is disposed on the plate surface to cover the entirety thereof. The resonance coil 33 corresponds to the resonance coil 13 illustrated in FIG. 1. The resonance coil 33 receives alternating-current power from the oscillator and coil (corresponding to the oscillating circuit 11 and the coil 12 illustrated in FIG. 1) embedded in the power transmitter 30.

Each of the rechargeable batteries 34-1 through 34-5 includes circuit components corresponding to the resonance coils 15-1 and 15-2, the capacitors 16-1 and 16-2, the coil 17, the rectifying circuit 18, and the battery 19 illustrated in FIG. 1. The numbers of resonance coils and capacitors may be two, but may preferably be a larger number such as three or four, for example, as will be described later. In each of the rechargeable batteries 34-1 through 34-5, at least one of the resonance coils receives power from the resonance coil 33 of the power transmitter 30 via magnetic resonance. During the charge operation, it may suffice for each of the cylindrical rechargeable batteries 34-1 through 34-5 to be placed horizontally on the plane surface of the power transmitter 30. There are no specific requirements for the horizontal direction and vertical direction in which each battery is placed.

Figure 4:
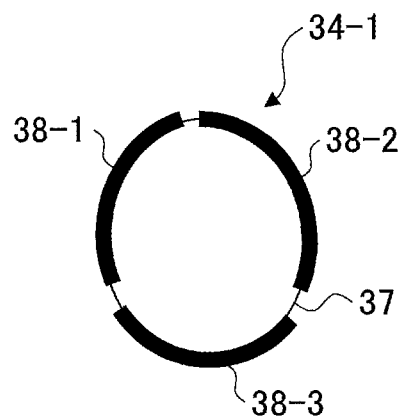
FIG. 4 is a drawing illustrating an example of the placement of resonance coils in a rechargeable battery.

FIG. 4 is a drawing illustrating an example of the placement of resonance coils in the rechargeable battery 34-1. The remaining rechargeable batteries 34-2 through 34-5 may have the same or similar configuration as the rechargeable battery 34-1. In FIG. 4, three power receiving resonance coils 38-1 through 38-3 are disposed on the cylinder side face 37 of the rechargeable battery 34-1. Magnetic shields are disposed on the inner side (i.e., the side closer to the center axis of the cylinder) of the resonance coils 38-1 through 38-3, thereby preventing metal materials inside the rechargeable battery from interfering with a magnetic field. The resonance coils 38-1 through 38-3 are disposed on the cylinder side face 37 to point to respective, different directions (e.g., 0 degree, 120 degrees, and 240 degrees). Because of this, proper power reception is achieved regardless of the rotating angle of the cylindrical rechargeable battery placed on the plane surface of the power transmitter 30.

Figure 5:
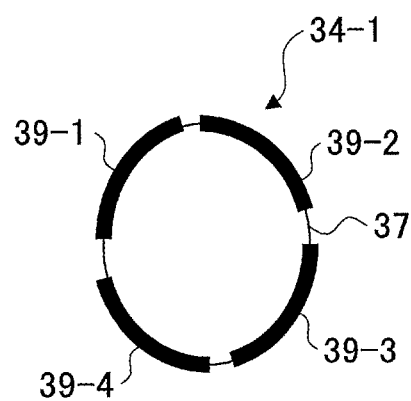
FIG. 5 is a drawing illustrating another example of the placement of resonance coils in a rechargeable battery.

FIG. 5 is a drawing illustrating another example of the placement of resonance coils in the rechargeable battery 34-1. The remaining rechargeable batteries 34-2 through 34-5 may have the same or similar configuration as the rechargeable battery 34-1. In FIG. 5, four power receiving resonance coils 39-1 through 39-4 are disposed on the cylinder side face 37 of the rechargeable battery 34-1. Magnetic shields are disposed on the inner side (i.e., the side closer to the center axis of the cylinder) of the resonance coils 39-1 through 39-4, thereby preventing metal materials inside the rechargeable battery from interfering with a magnetic field. The resonance coils 39-1 through 39-4 are disposed on the cylinder side face 37 to point to respective, different directions (e.g., 0 degree, 90 degrees, 180 degrees, and 270 degrees). Because of this, proper power reception is achieved regardless of the rotating angle of the rechargeable battery placed on the plane surface of the power transmitter 30.

Figure 6:
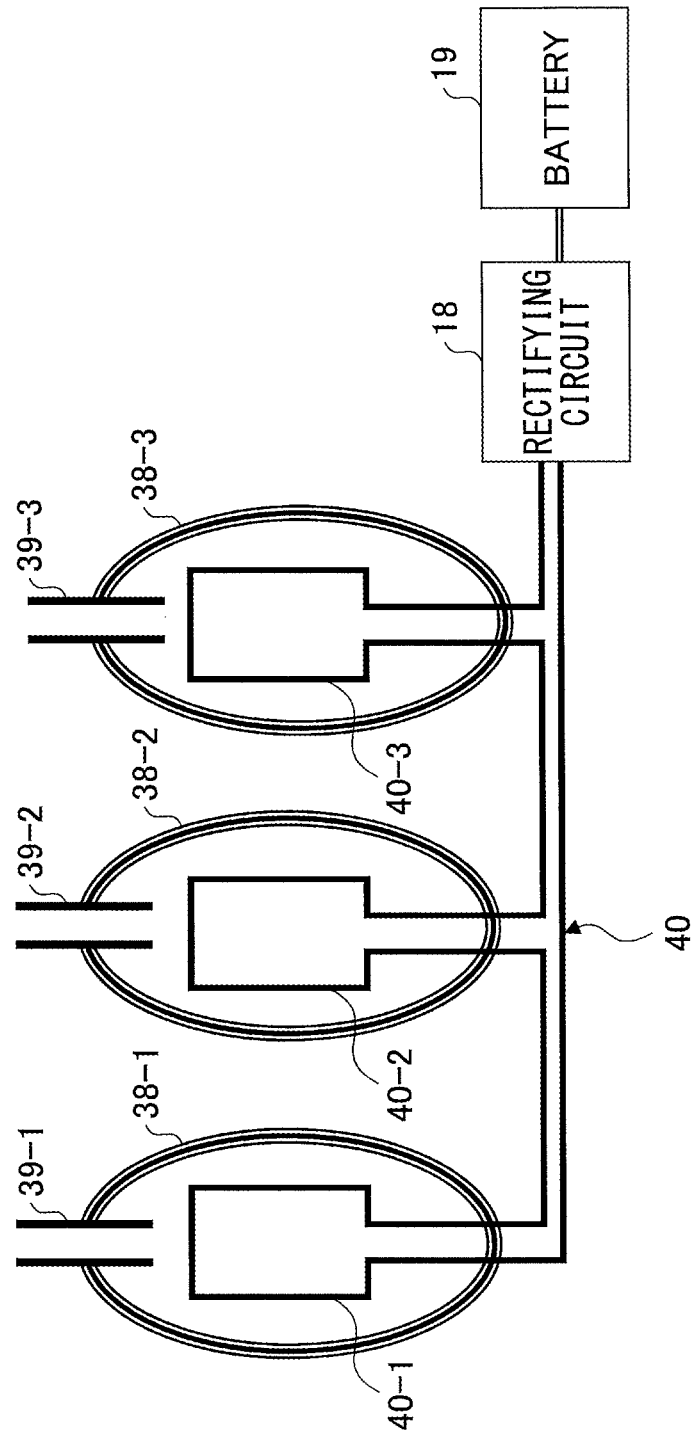
FIG. 6 is a drawing illustrating an example of the circuit configuration inside a rechargeable battery.

FIG. 6 is a drawing illustrating an example of the circuit configuration inside a rechargeable battery. The example of the circuit configuration illustrated in FIG. 6 corresponds to that of the rechargeable battery 34-1 illustrated in FIG. 4 which has three resonance coils. In FIG. 6, the rechargeable battery includes the resonance coils 38-1 through 38-3, capacitors 39-1 through 39-3, a coil wire 40, the rectifying circuit 18 and the battery 19. In FIG. 6, the same or corresponding elements as those of FIG. 1 or FIG. 4 are referred to by the same or corresponding numerals, and a description thereof will be omitted as appropriate.

The coil wire 40 is a single wire that starts at a first terminal of the rectifying circuit 18 serving as a power receiving circuit and ends at a second terminal of the rectifying circuit 18. The coil wire 40 forms one coil or a plurality of coils connected in series. In the example illustrated in FIG. 6, the coil wire 40 forms a plurality of coils 40-1 through 40-3 connected in series. The coils 40-1 through 40-3 connected in series and the respective resonance coils 38-1 through 38-3 are placed in such a manner that the corresponding coils can be coupled to each other via electromagnetic induction. More specifically, each of the coils 40-1 through 40-3 connected in series is placed in such a manner as to overlap the corresponding one of the resonance coils 38-1 through 38-3. The phrase "overlap" means that almost all the magnetic flux passing through a first coil passes through a second coil.

The phrase "a single wire starts at the first terminal of the rectifying circuit 18 and ends at the second terminal" means that this wire is a single line that neither divides nor intersects and that does not electrically intersect with itself or another line as far as the electromagnetic induction coupling with the resonance coils 38-1 through 38-3 is concerned. This arrangement does not prohibit a circuit configuration in which a circuit element unrelated to the electromagnetic induction coupling is provided in parallel with the coil wire 40. Namely, a line may branch off from the coil wire 40 that starts at the first terminal, and may then merge into the coil wire 40, as long as such a branch line does not relate to the electromagnetic induction coupling.

In the circuit configuration described above, the coils 40-1 through 40-3 and the respective resonance coils 38-1 through 38-3 are placed in such a manner that the corresponding coils can be coupled to each other via electromagnetic induction. With this arrangement, reception of power by one or more resonance coils through magnetic resonance causes the power to be transferred to the coil wire 40 through electromagnetic induction. In this circuit configuration, there is no need to provide a switching circuit for switching connections and no need to provide a circuit for controlling switching operations. Nor is there a need to provide a plurality of rectifying circuits. Accordingly, powers from a plurality of power receiving coils can be consolidated into one power without providing duplicate circuits or an additional circuit.

Figure 7:
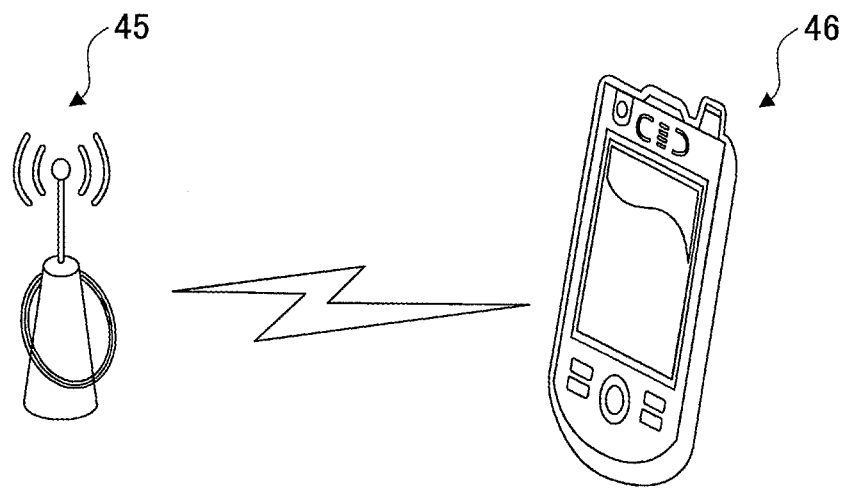
FIG. 7 is a drawing illustrating an example of a second embodiment of the power transmission system.

FIG. 7 is a drawing illustrating an example of a second embodiment of the power transmission system. The power transmission system illustrated in FIG. 7 includes a power transmitter 45 and a portable apparatus 46. The portable apparatus 46 is a power receiving apparatus that receives power form the power transmitter 45. The portable apparatus 46 may be a portal phone, a PDA (i.e., personal digital assistance), a portable music player, etc. The power transmitter 45 corresponds to the oscillating circuit 11, the coil 12, the resonance coil 13, and the capacitor 14 illustrated in FIG. 1. The portable apparatus 46 includes circuits corresponding to the resonance coils 15-1 and 15-2, the capacitors 16-1 and 16-2, the coil 17, the rectifying circuit 18, and the battery 19 illustrated in FIG. 1. Power is transmitted form the resonance coil of the power transmitter 45 to at least one of the resonance coils of the portable apparatus 46 through magnetic resonance.

Figure 8:
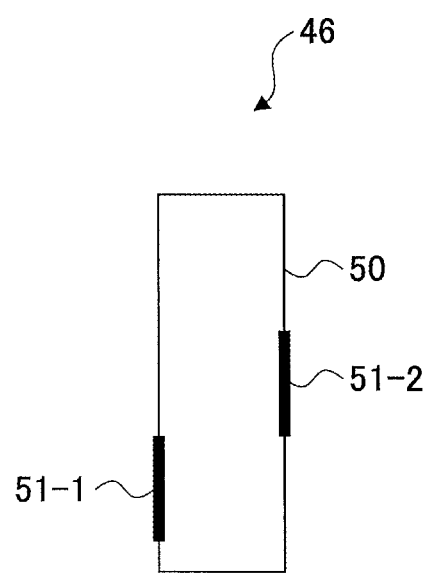
FIG. 8 is a drawing illustrating an example of the placement of resonance coils in a portable apparatus.

FIG. 8 is a drawing illustrating an example of the placement of resonance coils in the portable apparatus 46. In FIG. 8, the portable apparatus 46 has a case 50 of a flat box shape. Two power receiving resonance coils 51-1 and 51-2 are disposed on the two flat plane faces (i.e., the front face and the back face) of the case 50, respectively. Magnetic shields are disposed on the inner side (i.e., the side toward the center of the portable apparatus 46) of the resonance coils 51-1 and 51-2), so that metal materials inside the portable apparatus 46 do not interfere with a magnetic field. On the portable apparatus 46, the two resonance coils 51-1 and 51-2 are pointed in respective, different directions (i.e., the two opposite directions in this example). Placing the portable apparatus 46 in such a position that a flat plane face of the portable apparatus 46 is generally directed to the power transmitter 45 illustrated in FIG. 7 ensures proper power reception regardless of whether this face is the front face or the back face.

Figure 9:
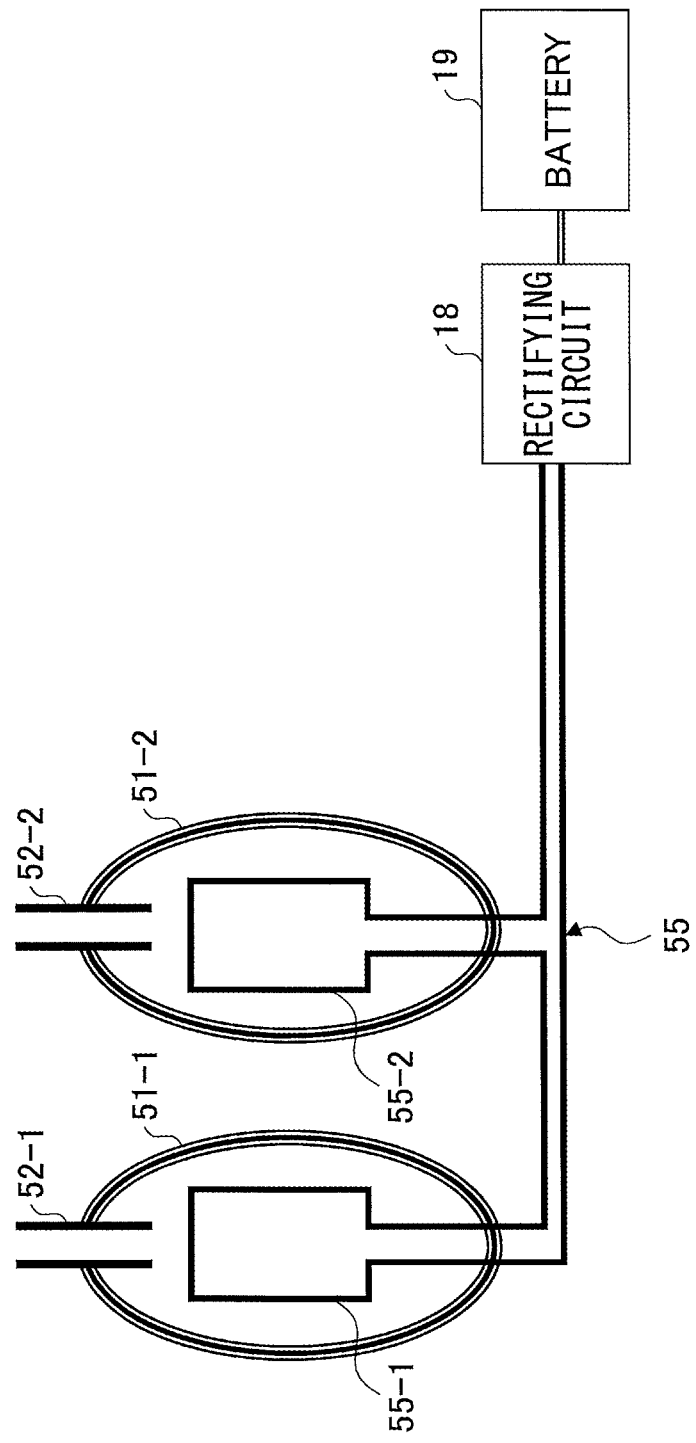
FIG. 9 is a drawing illustrating an example of the circuit configuration inside the portable apparatus.

FIG. 9 is a drawing illustrating an example of the circuit configuration inside the portable apparatus. In FIG. 9, the portable apparatus 46 includes the resonance coils 51-1 and 51-2, capacitors 52-1 and 52-2, a coil wire 55, the rectifying circuit 18 and the battery 19. In FIG. 6, the same or corresponding elements as those of FIG. 1 or FIG. 8 are referred to by the same or corresponding numerals, and a description thereof will be omitted as appropriate.

The coil wire 55 is a single wire that starts at a first terminal of the rectifying circuit 18 serving as a power receiving circuit and ends at a second terminal of the rectifying circuit 18. The coil wire 55 forms one coil or a plurality of coils connected in series. In the example illustrated in FIG. 9, the coil wire 55 forms a plurality of coils 55-1 and 55-2 connected in series. The coils 55-1 and 55-2 connected in series and the respective resonance coils 51-1 and 51-2 are placed in such a manner that the corresponding coils can be coupled to each other via electromagnetic induction. More specifically, each of the coils 55-1 and 55-2 connected in series is placed in such a manner as to overlap the corresponding one of the resonance coils 51-1 and 51-2. The phrase "overlap" means that almost all the magnetic flux passing through a first coil passes through a second coil.

The phrase "a single wire starts at the first terminal of the rectifying circuit 18 and ends at the second terminal" means that this wire is a single line that neither divides nor intersects and that does not intersect with another line while this wire runs from the first terminal to the second terminal, as far as the electromagnetic induction coupling with the resonance coils 51-1 and 51-2 is concerned. This arrangement does not prohibit a circuit configuration in which a circuit element unrelated to the electromagnetic induction coupling is provided in parallel with the coil wire 55. Namely, a line may branch off from the coil wire 55 that starts at the first terminal, and may then merge into the coil wire 55, as long as such a branch line does not relate to the electromagnetic induction coupling.

In the circuit configuration described above, the coils 55-1 and 55-2 connected in series and the respective resonance coils 51-1 and 51-2 are placed in such a manner that the corresponding coils can be coupled to each other via electromagnetic induction. With this arrangement, reception of power by one or more resonance coils through magnetic resonance causes the power to be transferred to the coil wire 55 through electromagnetic induction. In this circuit configuration, there is no need to provide a switching circuit for switching connections and no need to provide a circuit for controlling switching operations. Nor is there a need to provide a plurality of rectifying circuits. Accordingly, powers from a plurality of power receiving coils can be consolidated into one power without providing duplicate circuits or an additional circuit.

Figure 10:
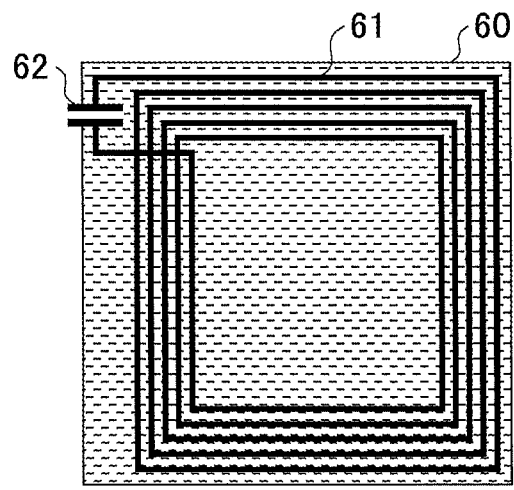
FIG. 10 is a drawing illustrating an example of the configuration of a resonance coil.

FIG. 10 is a drawing illustrating an example of the configuration of a resonance coil. A resonance coil on the transmission side and/or a resonance coil on the reception side may have the configuration illustrated in FIG. 10. In the example of the configuration illustrated in FIG. 10, the resonance coil is implemented as a rigid printed circuit board. The printed circuit board includes a rigid substrate 60 and a spiral coil 61 that is printed on the substrate 60. Further, a capacitor element 62 is connected to the coil 61.

Figure 11:
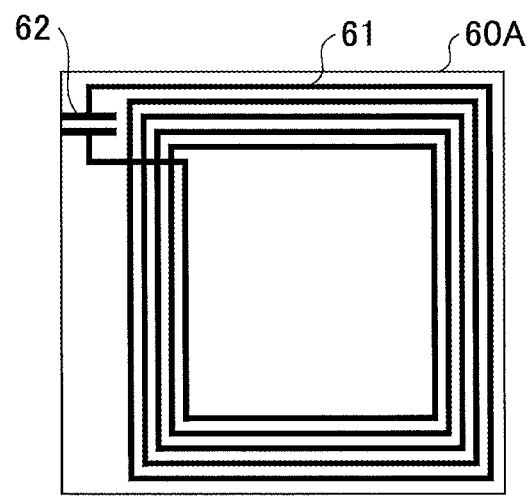
FIG. 11 is a drawing illustrating another example of the configuration of a resonance coil.

FIG. 11 is a drawing illustrating another example of the configuration of a resonance coil. A resonance coil on the transmission side and/or a resonance coil on the reception side may have the configuration illustrated in FIG. 11. In the example of the configuration illustrated in FIG. 11, the resonance coil is implemented as a flexible printed circuit board. The printed circuit board includes a flexible substrate 60A and the spiral coil 61 that is printed on the substrate 60A. Further, the capacitor element 62 is connected to the coil 61.

Figure 12:
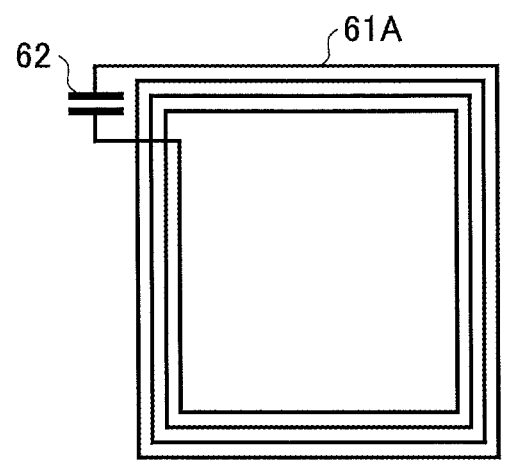
FIG. 12 is a drawing showing yet another example of the configuration of a resonance coil.

FIG. 12 is a drawing showing yet another example of the configuration of a resonance coil. A resonance coil on the transmission side and/or a resonance coil on the reception side may have the configuration illustrated in FIG. 12. In the example of the configuration illustrated in FIG. 12, the resonance coil is implemented as a copper line 61A that does not require a support member such as a substrate. The copper line 61A is formed into a spiral shape that draws a spiral on a plane. Further, the capacitor element 62 is connected to the copper line 61A.

Figure 13:
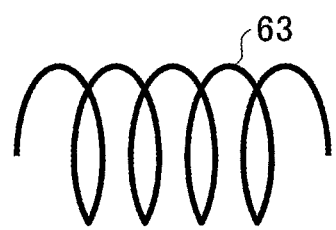
FIG. 13 is a drawing showing yet another example of the configuration of a resonance coil.

FIG. 13 is a drawing showing yet another example of the configuration of a resonance coil. A resonance coil on the transmission side and/or a resonance coil on the reception side may have the configuration illustrated in FIG. 13. In the example of the configuration illustrated in FIG. 13, the resonance coil is implemented as a copper line 63 that does not require a support member such as a substrate. The copper line is formed in a helical shape in which the line rotates around an axis as it moves in one direction along the axis. Further, the capacitor element 62 is connected to the copper line 63.

Figure 14:
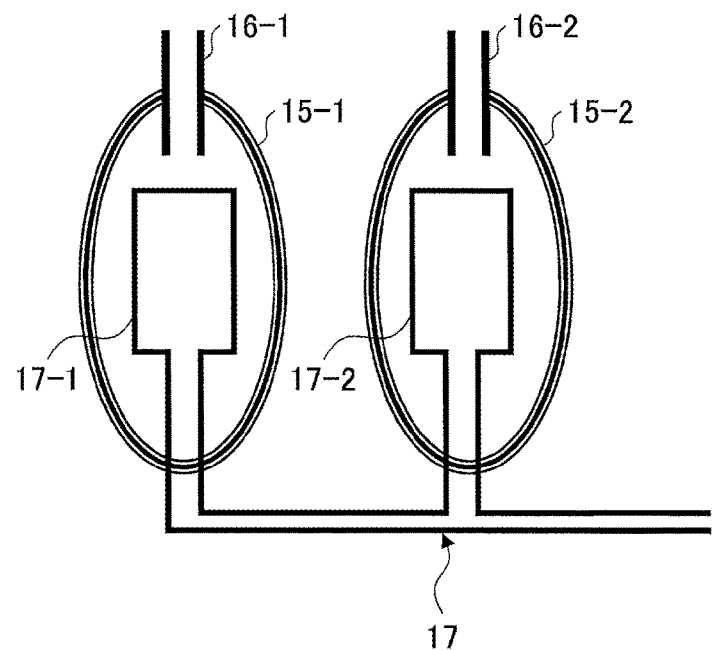
FIG. 14 is a drawing illustrating an example of the positional relationship between a plurality of resonance coils and one or more coils connected via wires to a power receiving circuit.

FIG. 14 is a drawing illustrating an example of the positional relationship between a plurality of resonance coils and one or more coils connected via wires to a power receiving circuit. In FIG. 14, the resonance coils 15-1 and 15-2 and the capacitors 16-1 and 16-2 correspond to the resonance coils 15-1 and 15-2 and the capacitors 16-1 and 16-2 illustrated in FIG. 1, respectively. Further, the coil wire 17 corresponds to the coil 17 of FIG. 1. In the example of positional relationship illustrated in FIG. 14, the coil wire 17 is a single line that starts at the first terminal of the power receiving circuit (e.g., the rectifying circuit 18 illustrated in FIG. 1) and ends at the second terminal. The coil wire 17 forms a plurality of coils 17-1 and 17-2 connected in series. Each of the coils 17-1 and 17-2 is a single-winding coil in this example. The coils 17-1 and 17-2 connected in series and the respective resonance coils 15-1 and 15-2 are placed in such a manner that the corresponding coils can be coupled to each other via electromagnetic induction. More specifically, each of the coils 17-1 and 17-2 connected in series is placed in such a manner as to overlap the corresponding one of the resonance coils 15-1 and 15-2. The phrase "overlap" means that almost all the magnetic flux passing through a first coil passes through a second coil.

Figure 15:
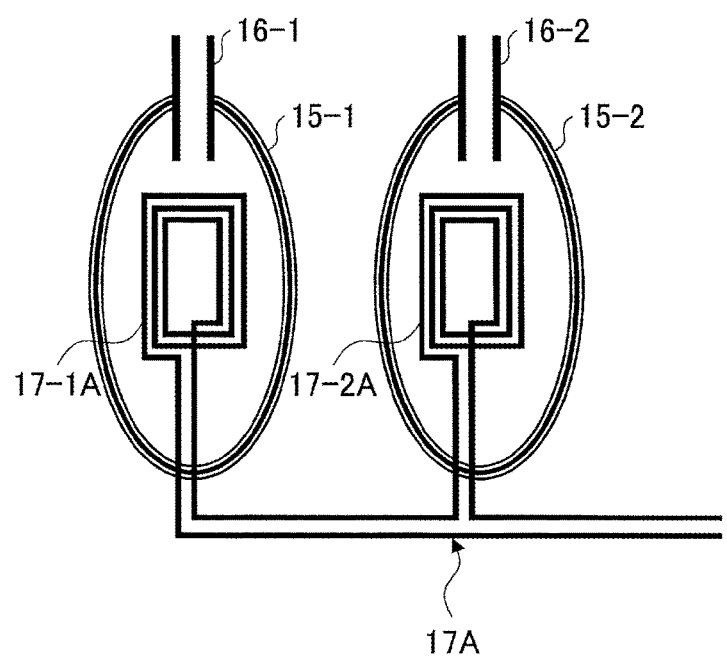
FIG. 15 is a drawing illustrating another example of the positional relationship between a plurality of resonance coils and one or more coils connected via wires to a power receiving circuit.

FIG. 15 is a drawing illustrating another example of the positional relationship between a plurality of resonance coils and one or more coils connected via wires to a power receiving circuit. The circuit wire line illustrated in FIG. 15 differs from the circuit wire line illustrated in FIG. 14 in that the coil is a single-winding structure or a multi-winding structure. The remaining configurations are substantially the same. In the example of positional relationship illustrated in FIG. 15, the coil wire 17A is a single line that starts at the first terminal of the power receiving circuit (e.g., the rectifying circuit 18 illustrated in FIG. 1) and ends at the second terminal. The coil wire 17 forms a plurality of coils 17-1A and 17-2A connected in series. Each of the coils 17-1A and 17-2A is a multi-winding coil in this example.

Figure 16:
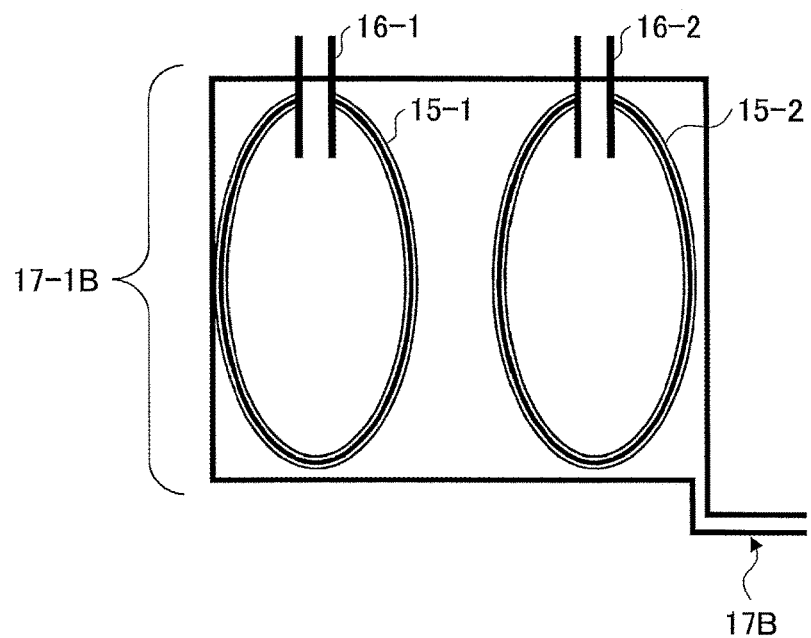
FIG. 16 is a drawing illustrating yet another example of the positional relationship between a plurality of resonance coils and one or more coils connected via wires to a power receiving circuit.

FIG. 16 is a drawing illustrating yet another example of the positional relationship between a plurality of resonance coils and one or more coils connected via wires to a power receiving circuit. In FIG. 16, the resonance coils 15-1 and 15-2 and the capacitors 16-1 and 16-2 correspond to the resonance coils 15-1 and 15-2 and the capacitors 16-1 and 16-2 illustrated in FIG. 1, respectively. Further, a coil wire 17B corresponds to the coil 17 of FIG. 1. In the example of positional relationship illustrated in FIG. 16, the coil wire 17B is a single line that starts at the first terminal of the power receiving circuit (e.g., the rectifying circuit 18 illustrated in FIG. 1) and ends at the second terminal. The coil wire 17B forms one coil 17-1B. The coil 17-1B is a single-winding coil in this example. Placement of the coils is arranged such that the coil 17-1B and the resonance coils 15-1 and 15-2 can be coupled to each other via electromagnetic induction. Specifically, the coil 17-1B is placed in such a manner as to overlap all of the resonance coils 15-1 and 15-2. The phrase "overlap" means that almost all the magnetic flux passing through a first coil (15-1 or 15-2) passes through a second coil (17-1B).

Figure 17:
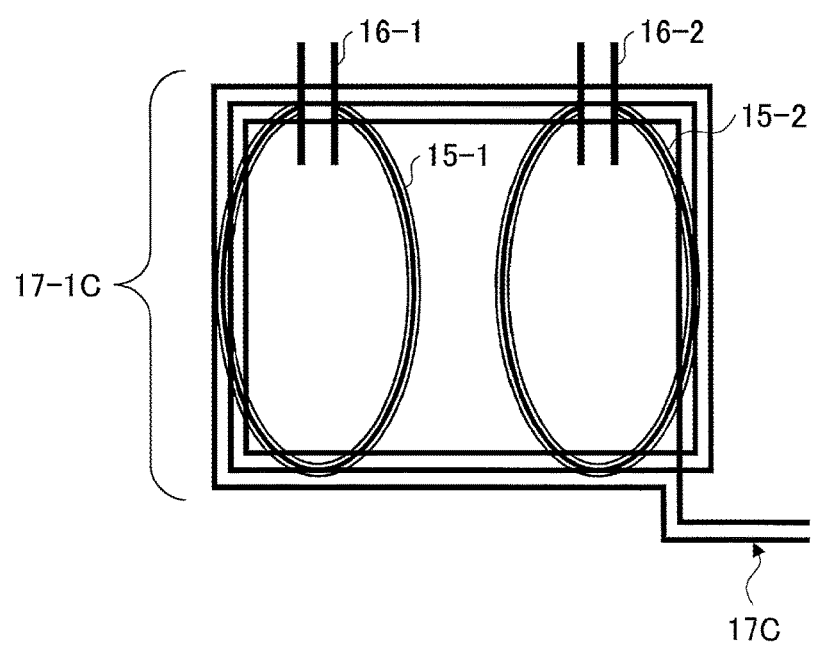
FIG. 17 is a drawing illustrating yet another example of the positional relationship between a plurality of resonance coils and one or more coils connected via wires to a power receiving circuit.

FIG. 17 is a drawing illustrating yet another example of the positional relationship between a plurality of resonance coils and one or more coils connected via wires to a power receiving circuit. The circuit wire line illustrated in FIG. 17 differs from the circuit wire line illustrated in FIG. 16 in that the coil is a single-winding structure or a multi-winding structure. The remaining configurations are substantially the same. In the example of positional relationship illustrated in FIG. 17, a coil wire 17C is a single line that starts at the first terminal of the power receiving circuit (e.g., the rectifying circuit 18 illustrated in FIG. 1) and ends at the second terminal. The coil wire 17C forms one coil 17-1C. The coil 17-1C is a multi-winding coil in this example.

According to at least one embodiment, a power receiving apparatus is provided in which powers from a plurality of power receiving coils can be combined into one power without using duplicating circuits or an additional circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A power receiving apparatus, comprising:
a plurality of resonance coils;
a power receiving circuit; and
a single wire configured to start at a first terminal of the power receiving circuit and to end at a second terminal of the power receiving circuit, the single wire forming a plurality of coils connected in series,
wherein the plurality of coils connected in series and the plurality of resonance coils are placed such that the plurality of coils connected in series are coupleable to the plurality of resonance coils,
wherein each of the plurality of coils connected in series is configured to overlap a corresponding one of the plurality of resonance coils, and
wherein the plurality of resonance coils are disposed at respective, different positions in the power receiving apparatus, and axes of the resonance coils are oriented at different angles.

2. The power receiving apparatus as claimed in claim 1, further comprising:
a core circuit; and
a plurality of magnetic shields disposed between the plurality of resonance coils and the core circuit, respectively.

3. The power receiving apparatus as claimed in claim 1, wherein the power receiving circuit is a rectifying circuit.

4. The power receiving apparatus as claimed in claim 1, wherein the different angles are spaced at constant intervals over a full 360-degree range.

5. A power transmission system, comprising:
a power transmission apparatus; and
a power receiving apparatus configured to receive power from the power transmission apparatus via magnetic resonance,
wherein the power receiving apparatus includes:
a plurality of resonance coils;
a power receiving circuit; and
a single wire configured to start at a first terminal of the power receiving circuit and to end at a second terminal of the power receiving circuit, the single wire forming a plurality of coils connected in series,
wherein the plurality of coils connected in series and the plurality of resonance coils are placed such that the plurality of coils connected in series are coupleable to the plurality of resonance coils,
wherein each of the plurality of coils connected in series is configured to overlap a corresponding one of the plurality of resonance coils, and
wherein the plurality of resonance coils are disposed at respective, different positions in the power receiving apparatus, and axes of the resonance coils are oriented at different angles.

6. The power transmission system as claimed in claim 5, wherein the power receiving apparatus further includes:
a core circuit; and
a plurality of magnetic shields disposed between the plurality of resonance coils and the core circuit, respectively.

7. The power transmission system as claimed in claim 5, wherein the different angles are spaced at constant intervals over a full 360-degree range.

8. A power transmission method, comprising:
supplying alternating-current power to a transmission-side resonance coil;
receiving power from the transmission-side resonance coil via electromagnetic induction with a plurality of reception-side resonance coils that are disposed at respective, different positions, axes of the reception-side resonance coils being oriented at different angles;
magnetically coupling the plurality of reception-side resonance coils with a single wire that forms a plurality of coils connected in series, each of the plurality of coils connected in series being configured to overlap a corresponding one of the plurality of reception-side resonance coils; and
supplying power from the single wire to a power receiving circuit.

9. The power transmission method as claimed in claim 8, wherein the different angles are spaced at constant intervals over a full 360-degree range.

* * * * *